(12) United States Patent
Strandberg et al.

(10) Patent No.: US 11,325,519 B1
(45) Date of Patent: May 10, 2022

(54) SECURING ASSEMBLY FOR SECURING A TOWER TO A WIND TURBINE TOWER

(71) Applicant: S&L ACCESS SYSTEMS AB, Gothenburg (SE)

(72) Inventors: Michael Strandberg, Västerås (SE); Kenneth Lundberg, Västerås (SE)

(73) Assignee: S&L Accesss Systems AB, Gothenburg (SE)

( * ) Notice: Subject to any disclaimer, the term of this patent is extended or adjusted under 35 U.S.C. 154(b) by 0 days.

(21) Appl. No.: 17/607,636

(22) PCT Filed: May 13, 2020

(86) PCT No.: PCT/EP2020/063273
§ 371 (c)(1),
(2) Date: Oct. 29, 2021

(87) PCT Pub. No.: WO2020/229513
PCT Pub. Date: Nov. 19, 2020

(30) Foreign Application Priority Data

May 14, 2019 (EP) .................................... 19174451

(51) Int. Cl.
*F03D 13/20* (2016.01)
*B60P 7/135* (2006.01)
*B43L 27/02* (2006.01)

(52) U.S. Cl.
CPC .............. *B60P 7/135* (2013.01); *B43L 27/02* (2013.01); *F03D 13/20* (2016.05)

(58) Field of Classification Search
CPC ... F03D 13/20; F03D 9/34; F03D 9/43; F03D 13/22; F03D 13/10; F03D 80/80; F03D 80/50; B60P 7/135; B60P 3/40; B60P 1/5438; B60P 1/5457; B60P 1/5471; B60P 3/28; E04H 12/34
USPC .............................. 410/44, 45, 120; 416/195
See application file for complete search history.

(56) References Cited

U.S. PATENT DOCUMENTS

| | | | | |
|---|---|---|---|---|
| 2,725,991 A * | 12/1955 | Kalle | ...................... | E04H 12/34 414/23 |
| 7,690,875 B2 * | 4/2010 | Grabau | ...................... | B60P 3/40 410/44 |
| 8,240,962 B2 * | 8/2012 | Livingston | .............. | F03D 13/40 410/2 |
| 9,266,701 B2 | 2/2016 | Bosco et al. | | |
| 11,053,103 B2 * | 7/2021 | Strandberg | ............ | B66C 23/207 |

(Continued)

FOREIGN PATENT DOCUMENTS

JP 2008-094628 A 4/2008
NL 1032591 C2 3/2008

*Primary Examiner* — Stephen T Gordon
(74) *Attorney, Agent, or Firm* — Dilworth & Barrese, LLP

(57) ABSTRACT

The present invention relates to a securing assembly (1) for securing an elongated support tower (2) to a wind turbine tower (3). The securing assembly (1) comprises a base part (1*a*) including: a tower holding part (4), a fixed part (5), two arms (6), a plate (6*c*) arranged at the outer part of each of the two arms (6), the plates (6*c*) can adapt to the curvature of the wind turbine tower (3) and each comprising at least one rope sliding element (9). The securing assembly (1) comprises a rope (8), being arranged via the rope sliding elements (9), and a rope tightening device (11) arranged on the base part (1*a*). The rope (8) presses the plates (6*c*) against the wind turbine tower (3) when tightened.

14 Claims, 8 Drawing Sheets

(56) References Cited

U.S. PATENT DOCUMENTS

2011/0255934 A1* 10/2011 Delgado Matarranz .................... F03D 13/20
410/55
2021/0270242 A1* 9/2021 Garcia De La Pena Razquin ...... B66C 23/30

* cited by examiner

SECURING ASSEMBLY FOR SECURING A TOWER TO A WIND TURBINE TOWER

TECHNICAL FIELD

The present invention relates to a securing assembly for securing an elongated tower to a wind turbine tower.

BACKGROUND

Wind turbines today require regular maintenance of its main components, such as rotor blades, gear boxes and generators. However, these components are often large and heavy, which poses an issue during both the assembly and the maintenance of the wind turbines. For example, the gear boxes may weigh between 20-45 tons, and the generators may weigh between 15-30 tons. Today, the most common solution is to use large, heavy cranes that lift the components from the ground with tall crane booms and long wires. One of the problems with these cranes is that they are highly sensitive to wind and cannot operate while the wind velocity exceeds certain limits, since the crane becomes too unstable and the wire might start to swing. This can result in stoppage of production for long periods of time, decreasing the profitability of the wind turbines. Additionally, the large size and weight of the cranes most commonly used today cause problems with transportation and assembly of the cranes. A large number of vehicles is required today to transport the different parts of the cranes, and once the transportation is completed, the assembly of these parts takes a very long time to finish. All the problems mentioned above cause the assembly and the maintenance of the wind turbines to become expensive and time-consuming.

Another area of wind turbines is the construction of new units. This involves lifting of tower segments on top of each other and installation at the top of the nacelle with a weight of about 120 tons.

U.S. Pat. No. 9,266,701 B2 discloses an enhanced stability crane, including a telescoping main support mast upon which a crane base resides. A boom projects upwardly from the crane base and a jib typically projects upwardly from the boom. The crane is adapted to have a load capacity of at least 160,000 pounds and a maximum jib height of at least 262 feet. This invention addresses the issue of stability by using a clamping assembly which resides on the main support mast and is configured to attach to an existing structure adjacent to the crane. The clamping assembly enhances the stability of the mast. The size and weight of the enhanced stability crane is also reduced in comparison to the cranes most commonly used today.

In NL 1,032,591 C2 another solution for the clamping assembly is shown in FIGS. 8 and 9. However short on details, the fixing structure of the documents has a support strip that is to go around a tower for stabilizing a crane. The document does not show how the fixing structure is attached to the crane.

Wind turbine towers today can be made higher than ever, with possible heights over 200 meters. There is always a need to increase the security for constructing new wind turbines and for reaching the top of the wind turbine tower with spare parts and for maintenance on the wind turbine tower.

SUMMARY

It is an aim of the present invention to at least partly overcome the above problems, and to provide a device for securing an elongated support tower to a wind turbine tower. The elongated support tower being risen to move part to and from the top of the wind turbine tower. Since the support tower will be very high, the security and stability of the support tower is ensured with a securing assembly for securing an elongated support tower to a wind turbine tower This aim is achieved by a device as defined herein.

The disclosure provides a securing assembly for securing an elongated support tower to a wind turbine tower. The securing assembly comprises a base part including: a tower holding part, a fixed part fixedly connected to the tower holding part and two arms, each arm comprising an inner part and an outer part. The securing assembly comprises a rope attached to the base part for at least partly surrounding the wind turbine tower and a plate arranged at the outer part of each of the two arms. The plates being arranged such that they can adapt to the curvature of the wind turbine tower and each comprising at least one rope sliding element, arranged to slidably hold the rope, arranged along the plate for guiding the rope around the wind turbine tower. The securing assembly comprises a rope tightening device arranged on the base part, wherein the rope is attached to the base part via the tightening device at at least one end. The rope is arranged via the rope sliding elements of the plates such that when the rope is tightened using the rope tightening device, the rope presses the plates against the wind turbine tower. The rope is to apply a high contact force of the plates on the wind turbine surface by tightening the rope. The plates increase the contact surface between the arms and the wind turbine tower and thus increases the stability of the securing assembly. The rope is thus slidably attached to the rope sliding elements at the plates. The rope is thus guided in the rope sliding elements on the plates. The rope can thus be used to assist the arms with the plates in clamping the wind turbine tower. A tightening device is used to tighten the rope around the wind turbine tower and thus more tightly securing the securing assembly to the wind turbine tower, via the plates. This securing arrangement allows for securing the elongated support tower to the wind turbine tower by being attached to the support tower and clamping the wind turbine tower with the two arms and holding it with the plates tightened with the rope. The rope is to be arranged around the wind turbine tower and is fastened in the securing assembly. The securing assembly is thus securing the elongated support tower to the wind turbine tower with both the arms, the plates and with the rope.

The elongated support tower is thus securely attached to the wind turbine tower with the securing assembly.

According to some aspects, the securing assembly comprises a support beam connected to the base part, for bearing against the wind turbine tower. The support beam gives an additional support to the securing assembly by pushing against the wind turbine tower to assist the arms in holding the securing assembly in a desired position relative the wind turbine tower and the elongated tower.

According to some aspects, the support beam is adapted to move linearly such that it presses against the wind turbine tower.

According to some aspects, the support beam is moved linearly by at least one telescopic arm with hydraulic, pneumatic or mechanical pistons extending and shortening the telescopic arm. A hydraulic, pneumatic or mechanical piston is a reliable and powerful device to use to move the support beam.

According to some aspects, at least one arm is movable relative to the other and the inner part of the least one moveable arm is rotatably attached to the tower holding part or the fixed part.

According to some aspects, the securing assembly comprises a moving mechanism adapted to move the at least one moveable arm such that the arms can clamp the wind turbine tower.

According to some aspects, the two arms are each movable relative to each other, each inner part being rotatably attached to the tower holding part or the fixed part and the moving mechanism being adapted to move each arm. Both arms are thus moveable for allowing more flexibility on which wind turbine towers the securing assembly can be used with.

According to some aspects, the rope sliding element has an opening for receiving a rope. The rope sliding element is thus arranged so that the rope cannot fall out of it since the sides of the opening encloses the rope on all sides.

The rope has a length such that it reaches around the wind turbine tower when the securing assembly arms clamps it.

According to some aspects, the tower holding part comprises an opening for receiving the support tower. The tower holding part thus holds the support tower on at least part of all sides of the support tower. The securing assembly is thus attached to the support tower by receiving the support tower in the opening.

According to some aspects, the tower holding part comprises at least one pinion for engaging a corresponding rack on the support tower so that the securing assembly is adapted to move along the longitudinal axis of the support tower. This allows for the securing assembly to move up and down the support tower and it also allows for the support tower to move up and down relative the securing assembly when the securing assembly is clamping the wind turbine tower.

According to some aspects, the two arms are telescopic arms, the inner part being a cover portion and the outer part being an extending portion, wherein the extending portion is adapted to at least partly be withdrawn into the cover portion to reduce the length of the arms. Different distances between the elongated support tower and the wind turbine tower can thus be compensated for by changing the length of the telescopic arms.

According to some aspects, the securing assembly comprises a hydraulic, pneumatic or mechanical piston inside the cover portion and wherein the extending portion is moved relative the cover portion with the piston. A hydraulic, pneumatic or mechanical piston is a reliable and powerful device to use to move the extending portion. When it is arranged on the inside of the cover portion it is also protected against the elements, such as rain and dirt.

According to some aspects, the moving mechanism comprises one hydraulic, pneumatic or mechanical pistons per moveable arm, each moving mechanism being connected to one arm and the fixed part. A hydraulic, pneumatic or mechanical piston is a reliable and powerful device to use to rotate the at least one moveable arm.

According to some aspects, the rope comprises more than one rope. It may be advantageous to use more than one rope such that redundancy is acquired and there is no problem if one rope breaks. It may also be easier to handle more than one thinner rope than to handle one thicker and stronger.

According to some aspects, the plates each comprises at least one rope sliding element per rope, and wherein the rope sliding elements are arranged to guide the ropes parallel to each other. The ropes are thus arranged in parallel, one over another, on the rope sliding elements of the plates. The ropes then do not interfere with each other since they are kept separate by the rope sliding elements.

According to some aspects, the plates comprises a friction material with a friction coefficient larger than 0.30 on a side facing the plate on the other arm. The friction material is thus on a side of the plate to abut the wind turbine tower. By arranging a material having a friction of larger than 0.3, the plates the securing assembly will be prevented from rotating relative the wind turbine tower when the plates are pressed against the support tower by the arms clamping it.

According to some aspects, the tightening device comprises a sliding part where an end of the rope is fastened, the sliding part being slidable to adjust the tension in the rope.

According to some aspects, the sliding part being pushed or pulled by a hydraulic, pneumatic or mechanical piston. A sliding part which is pulled and pushed by a piston is an effective way to tighten the rope with a lot of force.

According to some aspects, the securing assembly comprises a movement locking mechanism for each arm that is movable relative to the other, wherein the arms are prevented from moving when the movement locking mechanisms are actuated. The movement locking mechanism is thus a mechanism to be put in place when the arms are in a desirable position. The movement locking mechanism mechanically prevents the arms from moving and thus increases the security of the securing assembly.

According to some aspects, the securing assembly comprises two mechanical locking mechanisms, wherein the extending portions are prevented from moving relative the cover portions when the two mechanical locking mechanisms are actuated. The mechanical locking mechanism is thus a mechanism to be put in place when the arms are in a desirable position when the arms are telescopic arms. The locking mechanism physically prevents the extending portion and the cover portion from moving relative each other.

According to some aspects, the securing assembly comprises a rope locking mechanism for the tightening device, which locks the tightening device from moving when actuated. The rope can thus be locked from moving when it has been put in a desirable position and with a desirable tension.

According to some aspects, the securing assembly comprises an opening for receiving an elevator which is moving up or down the support tower, the opening being arranged adjacent the fixed part such that an operator riding the elevator can manually access the fixed part. An operator can thus move in an elevator along the elongated support tower without interfering with the securing assembly. The operator in the elevator can also stop the elevator in the opening and then reach many parts of the securing assembly. For example, the operator can secure the mechanical locking mechanisms and/or the movement locking mechanism(s) by hand when the arms are in a desirable position.

According to some aspects, the tower holding part (4) is adapted to at least partly surround the elongated support tower and the tower holding part having a height of at least 0.5 m. With a securing assembly which has a height, the "sticky drawer effect" is avoided when moving the securing assembly up and down. A higher securing assembly also distribute forces on the elongated support tower better than a lower securing assembly.

BRIEF DESCRIPTION OF THE DRAWINGS

The invention will now be explained more closely by the description of different embodiments of the invention and with reference to the appended figures.

DETAILED DESCRIPTION

Figure 1:
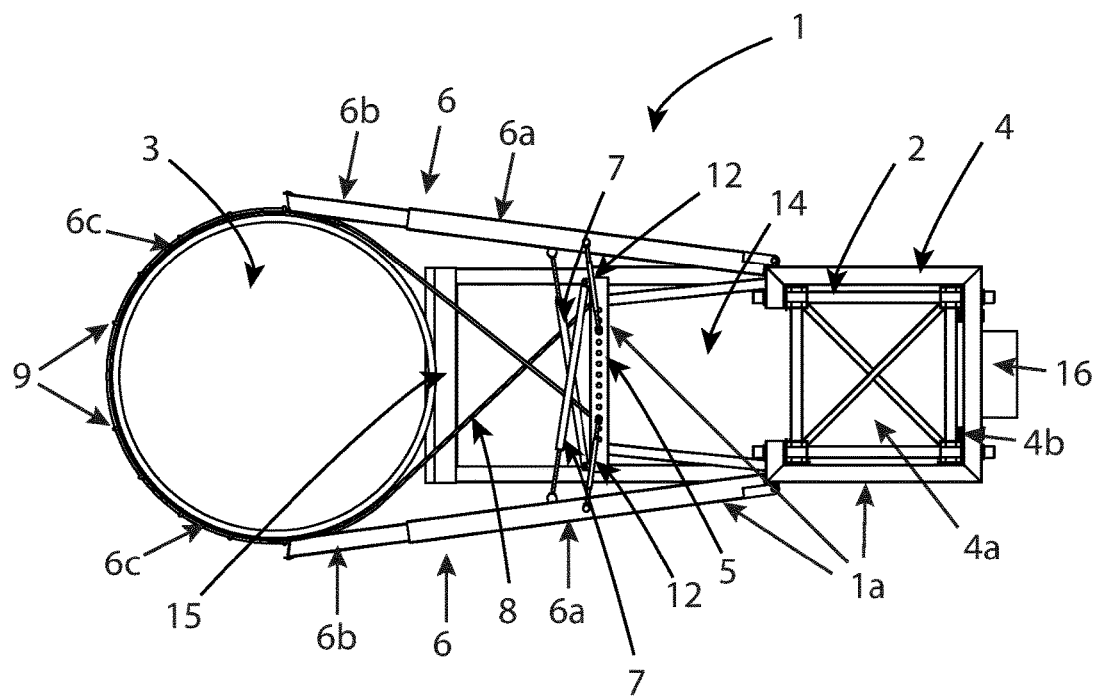
FIG. 1 shows an example securing assembly from above.

The present invention is not limited to the embodiments disclosed but may be varied and modified within the scope of the following claims.

Aspects of the present disclosure will be described more fully hereinafter with reference to the accompanying drawings. The devices and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs.

The term rope is herein used for all kinds of rope and arrangements that can be used as a rope, including wire rope and a tension strap. A rope may be made of a variety of materials, such as manila, polypropylene, polyester, nylon, aramid, jute, ultra-high molecular weight polyethylene (UHMWPE) and cotton. A rope may be constructed in a variety of ways such as single-braid, plaited, twisted, double-braided, hollow and diamond-braid.

Figure 2:
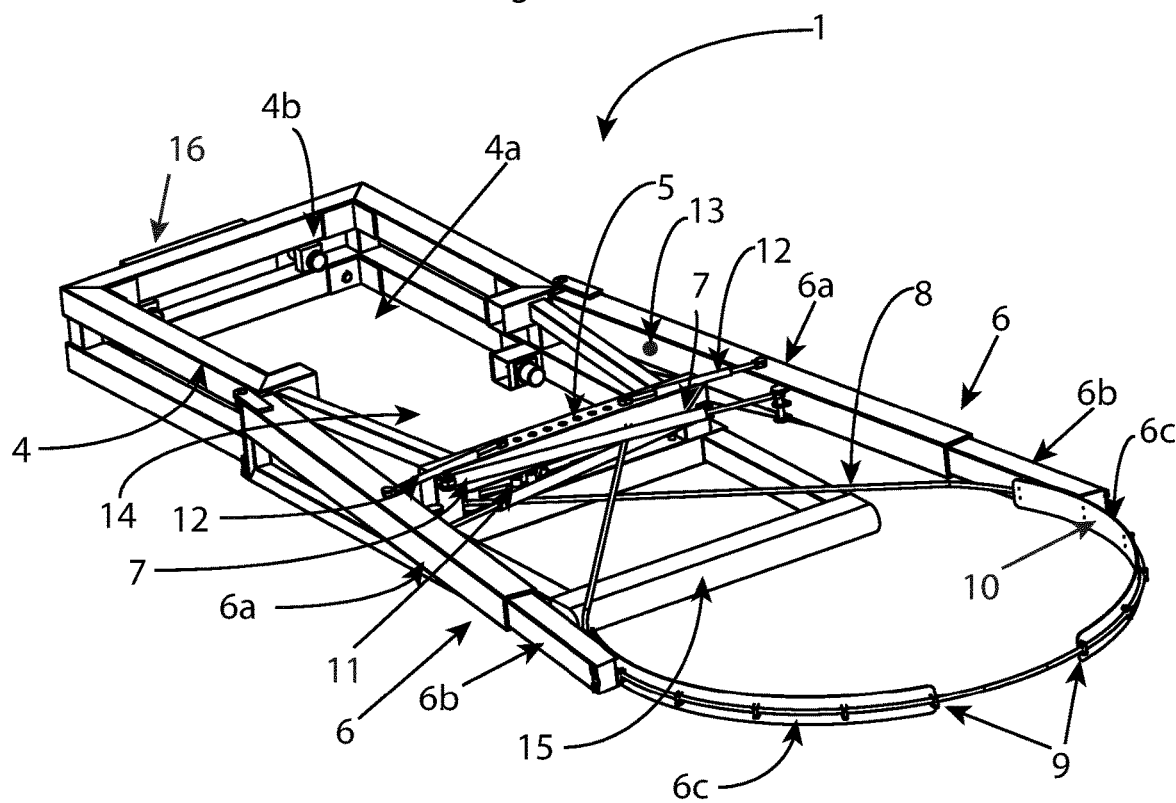
FIG. 2 shows an example securing assembly from a perspective view.
Figure 3:
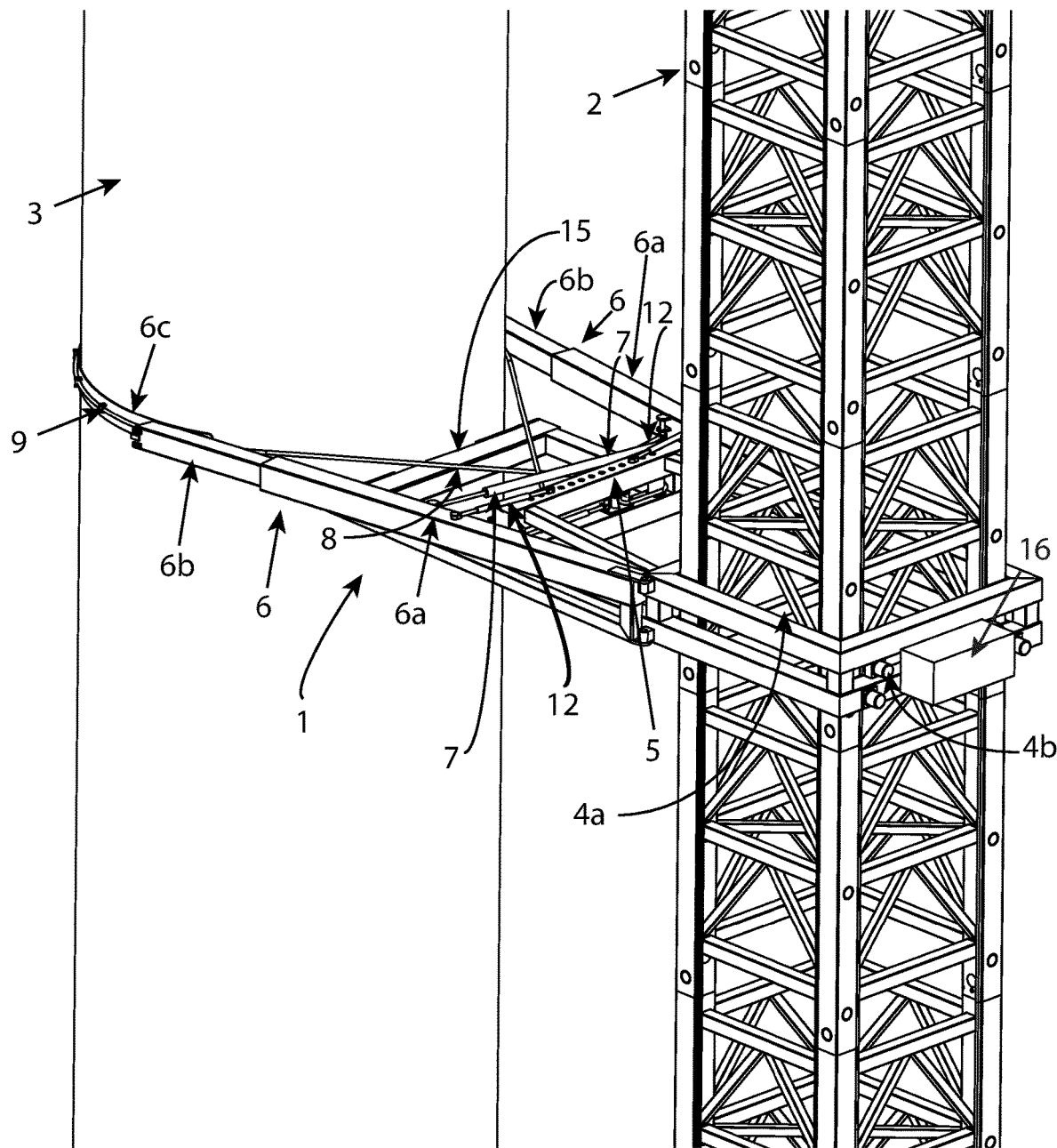
FIG. 3 shows an example securing assembly from a perspective view when it is arranged on a support tower and where the arms are clamping a wind turbine tower.
Figure 4:
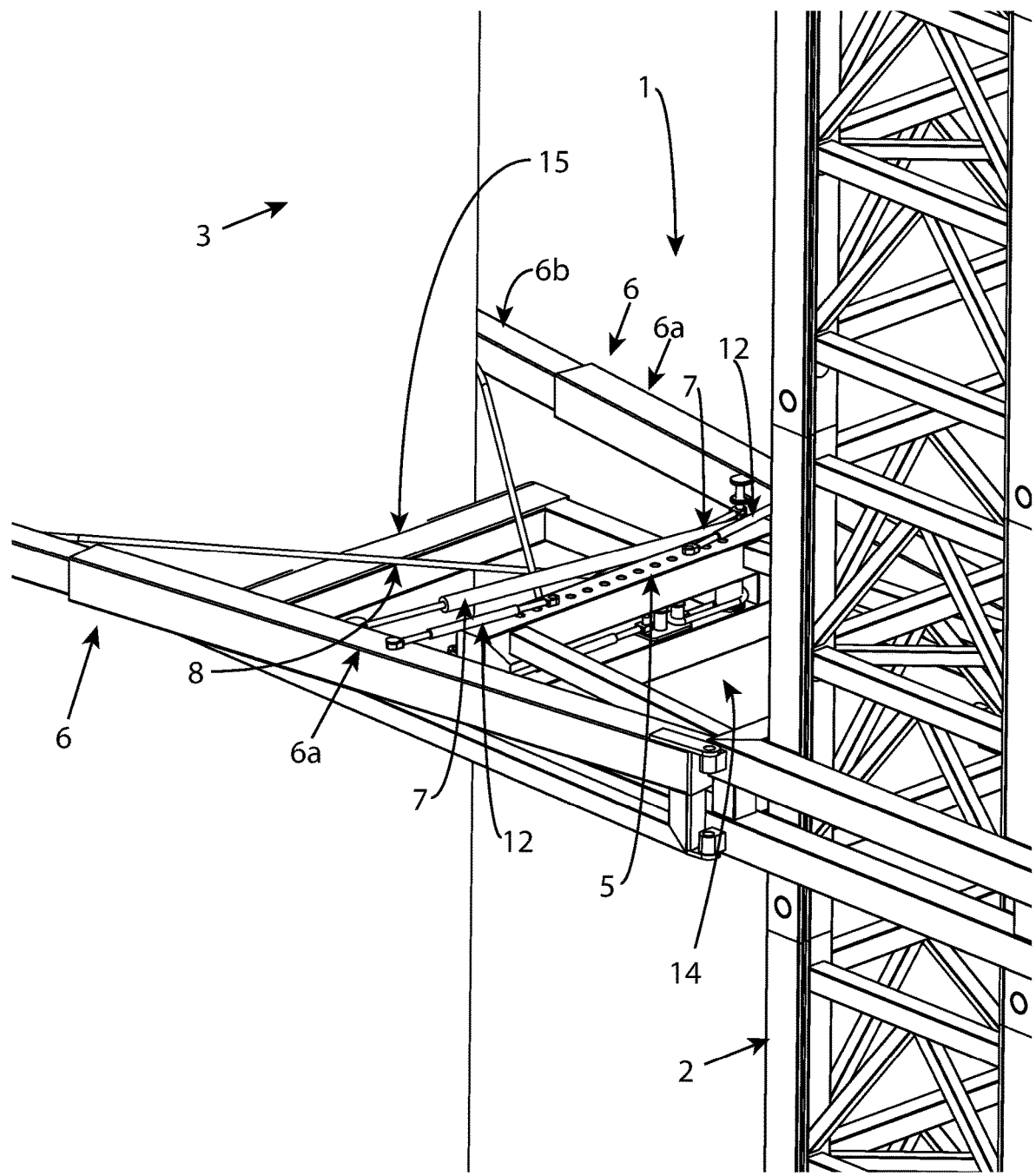
FIG. 4 shows a close up view of FIG. 3.

FIG. 1 shows an example securing assembly 1 from above and FIG. 2 shows an example securing assembly 1 from a perspective view. FIG. 3 shows an example securing assembly 1 from a perspective view when it is arranged on a support tower 2 and where the arms 6 are clamping a wind turbine tower 3. FIG. 4 shows a close up view of FIG. 3.

The disclosure provides a securing assembly 1 for securing an elongated support tower 2 to a wind turbine tower 3. The securing assembly 1 comprises a base part 1a including a tower holding part 4. The tower holding part 4 is a part that holds the securing assembly 1 to the elongated support tower 2. The tower holding part 4 may be an arrangement for fastening the securing assembly 1 to the support tower 2 on a side of the support tower 2 facing the wind turbine tower 3. In another example, the tower holding part 4 comprises an opening 4a for receiving the support tower 2. The tower holding part 4 thus holds the support tower 2 on at least part of all sides of the support tower 2. The securing assembly 1 is thus attached to the support tower 2 by receiving the support tower 2 in the opening 4a. In FIG. 1 it can be seen a tower holding part 4 that comprises an opening 4a for receiving the elongated support tower 2.

The securing assembly 1 may be lifted to its position and then fastened to the elongated support tower 2 or it may comprise means for climbing the support tower 2. According to some aspects, the tower holding part 4 comprises at least one pinion 4b for engaging a corresponding rack 4c on the support tower 2 so that the securing assembly 1 is adapted to move along the longitudinal axis of the support tower 2. This allows for the securing assembly 1 to move up and down the support tower 2 and it also allows for the support tower 2 to move up and down relative the securing assembly 1 when the securing assembly 1 is clamping the wind turbine tower 3.

The base part 1a includes a fixed part 5 fixedly connected to the tower holding part 4. The fixed part 5 is either directly or indirectly connected to the tower holding part 4. The fixed part 5 is thus fixed relative the tower holding part 4. As can be seen in FIG. 1, the fixed part 5 is connected to the tower holding part 4 by fixed beams. The beams are for making an opening 14 which can receive an elevator which will be described below in connection to FIG. 6.

The base part 1a includes two arms 6. Each arm comprising an inner part 6a and an outer part 6b.

The securing assembly comprises a rope 8 attached to the base part 1a for at least partly surrounding the wind turbine tower 3 and a plate 6c arranged at the outer part 6b of each of the two arms 6. The plates 6c being arranged such that they can adapt to the curvature of the wind turbine tower 3 and each comprising at least one rope sliding element 9, arranged to slidably hold the rope 8, arranged along the plate for guiding the rope 8 around the wind turbine tower 3. The securing assembly comprises a rope tightening device 11 arranged on the base part 1a, wherein the rope is attached to the base part 1a via the tightening device 11 at at least one end. The rope 8 is arranged via the rope sliding elements 9 of the plates 6c such that when the rope 8 is tightened using the rope tightening device 11, the rope 8 presses the plates 6c against the wind turbine tower 3. The rope is to ensure a high contact force of the plates on the wind turbine surface by tightening the rope. The plates increase the contact pressure between the arms and the wind turbine tower and thus increases the stability of the securing assembly. The rope is thus slidably attached to the plates at the outer part of the arms. The rope is thus guided in the rope sliding elements on the plate. The rope can thus be used to assist the arms with the plates in clamping the wind turbine tower. A tightening device is used to tighten the rope around the wind turbine tower and thus more tightly securing the securing assembly to the wind turbine tower, via the plates. This securing arrangement allows for securing the elongated support tower to the wind turbine tower by being attached to the support tower and clamping the wind turbine tower with the two arms and holding it with the plates tightened with the rope. The rope is to be arranged around the wind turbine tower and is fastened in the securing assembly. The securing assembly is thus securing the elongated support tower to the wind turbine tower with both the arms, the plates, and with the rope. The elongated support tower is thus securely attached to the wind turbine tower with the securing assembly.

As can be seen in the figures, the rope 8 may be arranged around the wind turbine tower 3 while also being slidably attached at the arms 6, via the plates 6*c*. The rope sliding elements 9 are thus guiding the rope 8 to the outer parts 6*b* of the arm, to the plates 6*c*. The rope 8 can thus be used to assist the arms 6 and the plates 6*c* in clamping more tightly to the wind turbine tower 3. The rope sliding elements 9 are thus arrangements that ensures that the rope 8 stays in position in connection to the plates 6*c* when the arms 6 and rope 8 are holding a wind turbine tower 3. The rope 8 slides lengthwise in the rope sliding elements 9.

The plates 6*c* are, for example, made of a relatively thin material to be able to adjust to the surface of the wind turbine tower and to different tower diameters. The material can be for example steel, aluminium, plastic, carbon fibre or some type of other composite material.

The rope is thus attached to the tower holding part 4, the fixed part 5 or one or both arms 6 via the plates 6*c*. This securing arrangement allows for securing the elongated support tower 2 to the wind turbine tower 3 by being attached to the support tower 2 and clamping the wind turbine tower 3 with the two arms 6. The rope 8 can be arranged around the wind turbine tower 3 and is fastened in the securing assembly 1. The securing assembly 1 is thus securing the elongated support tower 2 to the wind turbine tower 3 with both the arms 6, the plates 6*c* and with the rope 8 which is tightened with the tightening device. The elongated support tower 2 is thus securely attached to the wind turbine tower 3 with the securing assembly 1.

The tightening device 11 is used to tighten the rope 8 around the wind turbine tower 3 and thus more tightly securing the securing assembly 1 to the wind turbine tower 3. A tightening device 11 can be realized in many different ways, for example by using a winch or any kind of linearly moving mechanism.

The rope sliding elements 9 are, for example, loops along the plate 6*c* that keep the rope 8 in its correct place. The rope is to apply force and create pressure between the plates 6*c* and the wind turbine tower. The pressure creates friction between surfaces of the plates 6*c* and the wind turbine tower that face each other. This friction is the key to handle the big forces that occurs when wind affects the whole assembly of the elongated support tower and securing assembly.

The forces on the support tower from the wind transfers into the arms 6 and into the plates 6*c* that are prevented from sliding, because of the friction between the plate 6*c* and the wind turbine tower. In a large tower construction, the forces are too big to be transferred directly from the telescopic arms to the rope.

The plates 6*c* are also needed to protect the surface of the wind turbine tower. The forces need to be distributed on a larger area do not to shear the paint from the steel surface.

According to some aspects, the rope sliding element 9 has an opening 9*a* for receiving a rope 8. In other words, the rope sliding element 9 may comprise a loop for slidably receiving the rope 8. The opening 9*a*, i.e. the loop, is thus some kind of eye for receiving a rope 8. The rope sliding element is thus arranged so that the rope cannot fall out of it since the sides of the opening encloses the rope on all sides.

The rope 8 has a length such that it reaches around the wind turbine tower 3 when the securing assembly 1 arms 6 clamps it. Depending on where the rope 8 is fastened, the rope 8 may not be able to encircle the whole circumference of the wind turbine tower 3.

As can be seen in the example securing assembly 1 illustrated in the figures, the securing assembly 1 may comprise a support beam 15 connected to the base part 1*a*, for bearing against the wind turbine tower 3. The support beam 15 being, for example, a bar which is arranged on at least one telescopic arm such that it can press against the wind turbine tower 3. The bar may be rounded for an increased contact area with the wind turbine tower 3. The contact area of the bar between the bar and the wind turbine tower 3 may be arranged with a material with a friction coefficient larger than 0.30 for increased stability. The material may also be a soft material for preventing scraping of the wind turbine tower 3. The material is for example rubber. The support beam 15 gives an additional support to the securing assembly 1 by pushing against the wind turbine tower 3 to assist the arms 6 in holding the securing assembly 1 in a desired position relative the wind turbine tower 3 and the elongated support tower 2. According to some aspects, the support beam 15 is adapted to move linearly such that it presses against the wind turbine tower 3. The support beam 15 is, for example, moved linearly by at least one telescopic arm with hydraulic, pneumatic or mechanical pistons extending and shortening the telescopic arm. The support beam may be moved linearly by other means, such as a rack and pinion arrangement or any kind of mechanism which provides a linear guiding system. A hydraulic, pneumatic or mechanical piston is a reliable and powerful device to use to move the support beam. The support beam 15 may also be fixed According to some aspects, at least one arm is movable relative to the other and the inner part 6*a* of the least one moveable arm is rotatably attached to the tower holding part 4 or the fixed part 5. The at least one moveable arm is moveable in a plane substantially perpendicular to the longitudinal axis of the support tower 2. In other words, one or both arms 6 are movable relative to the other. With substantially perpendicular to the longitudinal axis of the support tower 2 is meant that the plane can deviate from the perpendicular plane with ±15° and preferably with ±5°. Accordingly, the at least one arm is movable relative to the other in a horizontal plane or in a plane that deviates from the horizontal plane with ±15° and preferably with ±5°. At least one moveable arm makes it easier to use the securing assembly with wind turbine towers of different diameters. It may also be easier to move the securing assembly up and down the elongated tower if the arms can be moved such that they are not abutting the wind turbine tower. The rotatable attachment can be seen in FIG. 1 and is for example an articulated bracket.

According to some aspects, the securing assembly comprises a moving mechanism 7 adapted to move the at least one moveable arm such that the arms 6 can clamp the wind turbine tower 3. According to some aspects, the two arms 6 are each movable relative to each other, each inner part 6*a* being rotatably attached to the tower holding part 4 or the fixed part 5 and the moving mechanism 7 being adapted to move each arm. Both arms 6 may thus be moveable for allowing more flexibility on which wind turbine towers 3 the securing assembly 1 can be used with.

The moving mechanism 7 comprises, for example, one hydraulic, pneumatic or mechanical pistons per moveable arm, each moving mechanism 7 being connected to one arm and the fixed part 5. A hydraulic, pneumatic or mechanical piston is a reliable and powerful device to use to rotate the at least one moveable arm. An alternative to a piston is to use a wire system for moving the arms 6. The moving mechanism 7 is for example connected to the cover portion 6*a* of the arm. The moving mechanism may also be that the arms are attached to a respective spring which pushed the arms out from each other. Wires may then be used to pull the arms towards the wind turbine tower.

When using the securing assembly 1 to secure an elongated support tower 2 to a wind turbine, different towers may have a different distance between them. According to some aspects, the two arms 6 are telescopic arms 6, the inner part 6a being a cover portion 6a and the outer part 6b being an extending portion 6b, the extending portion 6b is adapted to at least partly be withdrawn into the cover portion 6a to reduce the length of the arms 6. Different distances between the elongated support tower 2 and the wind turbine tower 3 can thus be compensated for by changing the length of the telescopic arms 6.

According to some aspects, the securing assembly 1 comprises a hydraulic, pneumatic or mechanical piston inside the cover portion 6a and wherein the extending portion 6b is moved relative the cover portion 6a with the piston. A hydraulic, pneumatic or mechanical piston is a reliable and powerful device to use to move the extending portion 6b. When it is arranged on the inside of the cover portion 6a it is also protected against the elements, such as rain and dirt. The extending portion 6b can also be moved relative the cover portion 6a by other means, such as a rack and pinion arrangement or any kind of mechanism which provides a linear guiding system.

In the example securing assembly 1 shown in the figures, and as described above, the two arms 6 each comprises a plate 6c at the outer part 6b, the plates being arranged such that it can adapt to the curvature of the wind turbine tower 3. The plates 6c may be pre-bent such that they approximately match the curvature of a wind turbine tower 3. The plates 6c increase the contact surface between the arms 6 and the wind turbine tower 3 and thus increases the stability of the securing assembly 1. The plates 6c may comprise steel, plastic, composite material, any kind of metal which allows for the plate 6c to be flexible.

The plates 6c each comprises the at least one rope sliding element 9 arranged along the plate for guiding the rope 8 around the wind turbine tower 3. The rope 8 is thus guided in the rope sliding elements 9 on the plates 6c. Each plate 6c may have two or more rope sliding elements 9 arranged along the plates 6c. The rope sliding element may also be a groove in the plates 6c or, for example, a combination of grooves and loops. In the case where each plate 6c has two or more rope sliding elements 9 arranged along the plates 6c, the rope sliding elements 9 are aligned along the plates 6c.

The plates are, according to some aspects, arranged on the outer part 6b of the arms 6, on a side of the outer part 6b that is facing the other outer part 6b. The plates 6c are then arranged with a first side facing the respective outer part 6b and a second side facing the other plate 6c. The rope sliding element are, for example, arranged on the first side of the plates 6c. An alternative is that the rope sliding elements are arranges in a channel inside the plates 6c.

If the plate 6c is pre-bent, the at least one rope sliding element 9 is arranged on the convex side of the pre-bent steel plate 6c. The rope 8 is thus be used to tighten the plates 6c and the arms 6 around the wind turbine tower 3 for increased stability in the grip of the securing assembly 1.

As can be seen in the figures, the rope 8 may be arranged between the plates 6c of the arms 6 and the rest of the arms 6. In such a case there may be a rope sliding element 9 between the arm and the plate 6c of the arm. Alternatively, a welding or other fastening of the plate 6c to the arm is done such that there is a gap for the rope 8 to pass through.

According to some aspects, the rope 8 comprises more than one rope 8. It may be advantageous to use more than one rope 8 such that redundancy is acquired and there is no problem if one rope 8 breaks. It may also be easier to handle more than one thinner rope 8 than to handle one thicker rope 8. According to some aspects, the plates 6c each comprises at least one rope sliding element 9 per rope 8, and wherein the rope sliding elements 9 are arranged to guide the ropes 8 parallel to each other. The ropes 8 are thus arranged in parallel, one over another, on the rope sliding elements 9 of the plates 6c. In other words, if there are more than one rope 8, rope sliding elements 9 may be used to arrange the ropes 8 next to each other over the widths of the plates 6c so that they run in parallel along the lengths of the plates 6c. The ropes 8 then do not interfere with each other since they are kept separate by the rope sliding elements 9.

The inside of the plates 6c is, for example, covered with a polymer material that can adjust to the surface of the wind turbine tower and create friction which assists in securing the plates 6c against the wind turbine tower.

According to some aspects, the plates 6c comprises a friction material 10 with a friction coefficient larger than 0.30 on a side facing the plate 6c on the other arm. The material is thus on a side of the plate 6c to abut the wind turbine tower 3. By arranging a material having a friction of larger than 0.3, the plates 6c the securing assembly 1 will be prevented from rotating relative the wind turbine tower 3 when the plates 6c are pressed against the wind turbine tower 3 by the arms 6 clamping it. The material is for example rubber.

Figure 5:
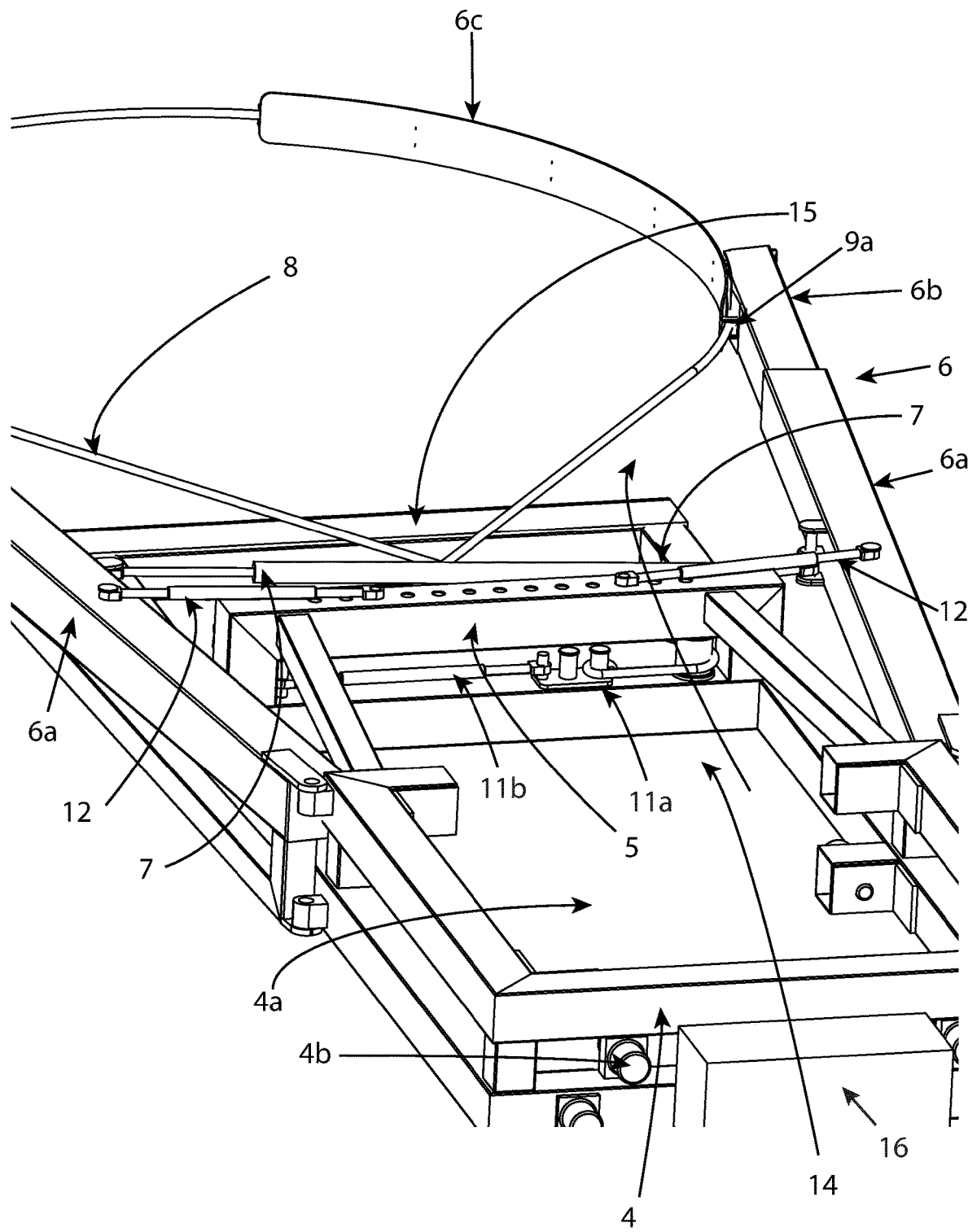
FIG. 5 shows a close up view on an example tightening device.

FIG. 5 shows a close up view on an example tightening device 11. According to some aspects, the tightening device 11 comprises a sliding part 11a where an end of the rope 8 is fastened, the sliding part being slidable to adjust the tension in the rope (8). According to some aspects, the sliding part 11a being pushed or pulled by a hydraulic, pneumatic or mechanical piston 11b. A sliding part 11a which is pulled and pushed by a piston 11b is an effective way to tighten the rope 8 with a lot of force. In the example tightening device 11 of FIG. 5, the rope 8 also passes a roller for aligning the rope 8 to the slider. The roller may not be necessary, depending on where the rope 8 is fastened. If the rope 8 is fastened to either of the arms 6 or one of the arms 6, the tightening device 11 is arranged at the fastening of one end of the rope 8.

When the securing assembly 1 has been arranged in its desired position, it is not to be moved until the elongated support tower 2 is to be removed. Therefore, for redundancy and extra security, mechanical locks for locking the arms 6 in position may be used. According to some aspects, the securing assembly 1 comprises a movement locking mechanism 12 for each arm that is movable relative to the other, wherein the arms 6 are prevented from moving when the movement locking mechanisms 12 are actuated. The movement locking mechanism 12 is thus a mechanism to be put in place when the arms 6 are in a desirable position. The movement locking mechanism 12 mechanically prevents the arms 6 from moving and thus increases the security of the securing assembly 1. Example locking mechanisms can be seen in the figures. The illustrated examples are put in position by an operator when the securing assembly 1 is in its desired position. The movement locking mechanism 12 may also be a mechanism that can lock the arms 6 in position without an operator using for example pins that extend into an associated hole when the arms 6 are in position.

Mechanisms for locking the tension of the rope may also be provided. According to some aspects, the securing assembly comprises a rope locking mechanism 11c for the tightening device 11, which locks the tightening device 11 from moving when actuated. The rope can thus be locked from moving when it has been put in a desirable position and with a desirable tension.

A locking mechanism for locking the telescopic arms 6 in position may also be provided. According to some aspects, the securing assembly 1 comprises two mechanical locking mechanisms 13, wherein the extending portions 6*b* are prevented from moving relative the cover portions 6*a* when the two mechanical locking mechanisms 13 are actuated. The mechanical locking mechanism is thus a mechanism to be put in place when the arms 6 are in a desirable position when the arms 6 are telescopic arms 6. The locking mechanism physically prevents the extending portion 6*b* and the cover portion 6*a* from moving relative each other. The locking mechanisms are for example pins that are actuated into associated holes for a mechanical locking. The actuation may be motor driven or done by an operator.

Figure 6:
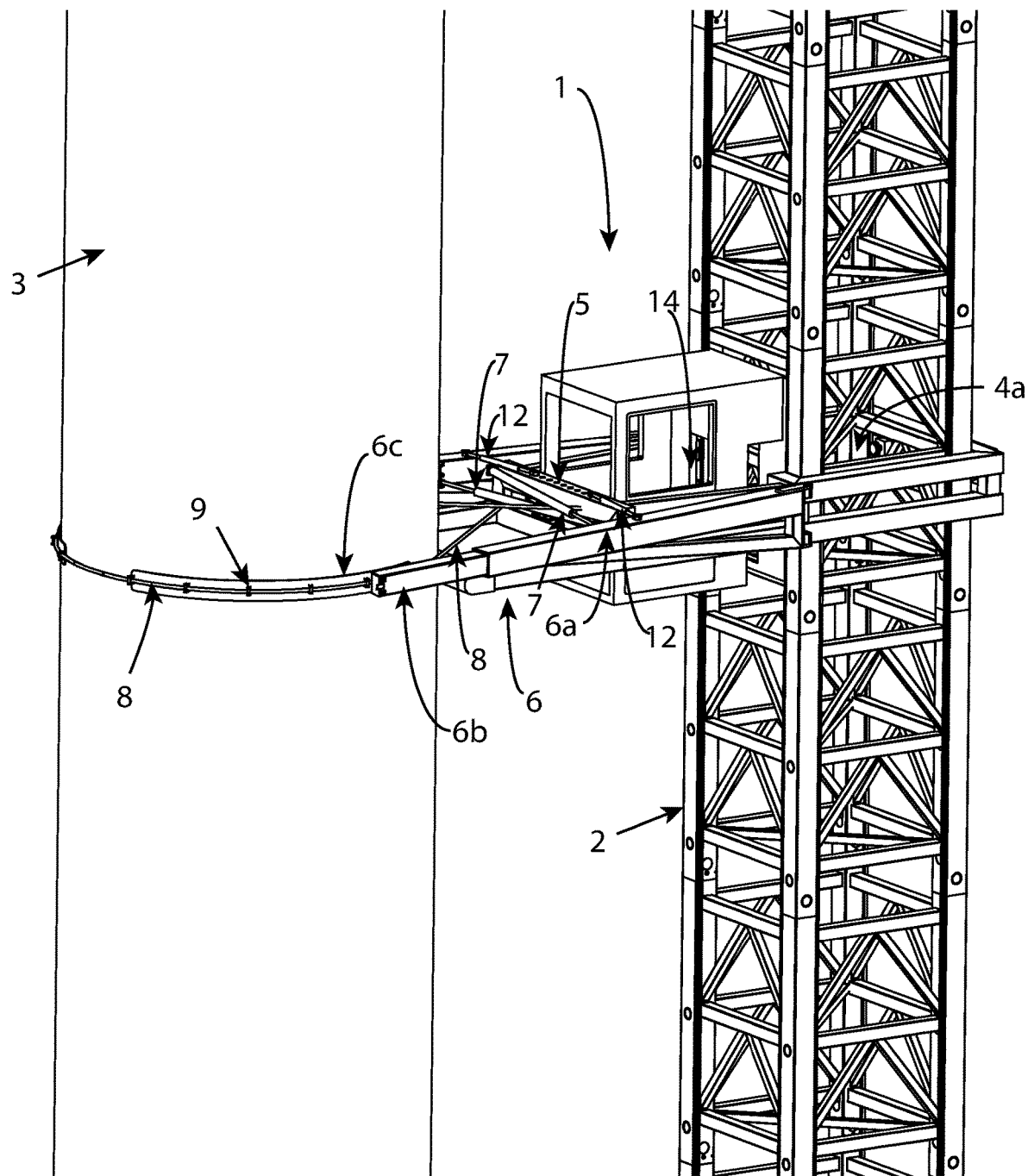
FIG. 6 shows an example securing assembly when it is arranged on a support tower and where the arms are clamping a wind turbine tower and when an elevator is passing through the opening for the elevator.

FIG. 6 shows an example securing assembly 1 when it is arranged on a support tower 2 and where the arms 6 are clamping a wind turbine tower 3 and when an elevator is passing through the opening 14 for the elevator. According to some aspects, the securing assembly 1 comprises an opening 14 for receiving an elevator which is moving up or down the support tower 2, the opening 14 being arranged adjacent the fixed part 5 such that an operator riding the elevator can manually access the fixed part 5. Adjacent in this case means so close that an operator located in the elevator reaches the fixed part 5. An operator can thus move in an elevator along the elongated support tower 2 without interfering with the securing assembly 1. The operator in the elevator can also stop the elevator in the opening 14 and then reach many parts of the securing assembly 1. For example, the operator can secure the mechanical locking mechanisms 13 and/or the movement locking mechanism(s) 12 by hand when they are arranged on the fixed part 5 or on the inner part 6*a*.

The box attached to the tower holding part 4 is representing a driving mechanism 16 for the tightening device and/or the movement locking mechanism. The driving mechanism is for example a pump in case hydraulic pistons are used. It may also be an electrical generator if pinions and racks are used or a combination of both. The driving mechanism may be arranged anywhere on the securing assembly as long as it does not interfere with its function. It may be arranged on the fixed part such that an operator standing in an elevator can reach it.

Figure 7:
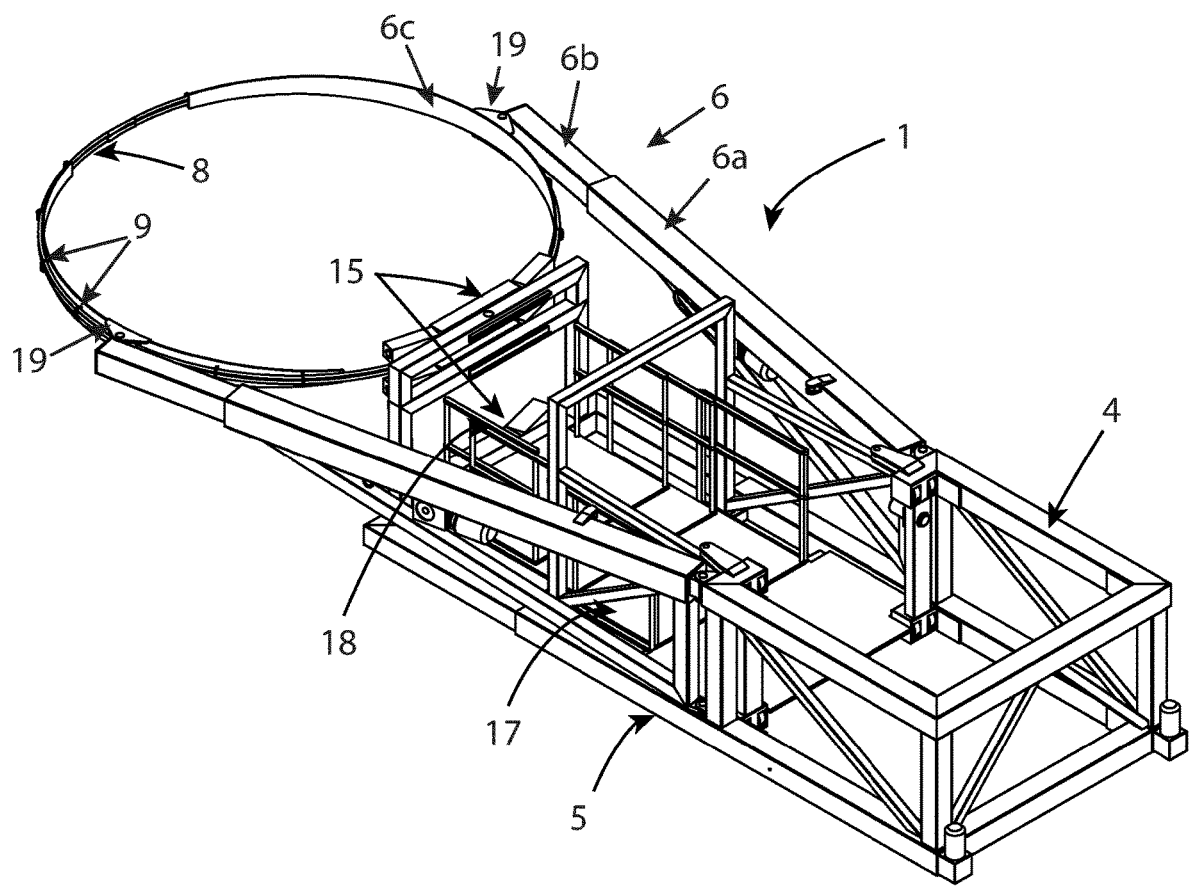
FIG. 7 shows an example securing assembly from a perspective view.
Figure 8:
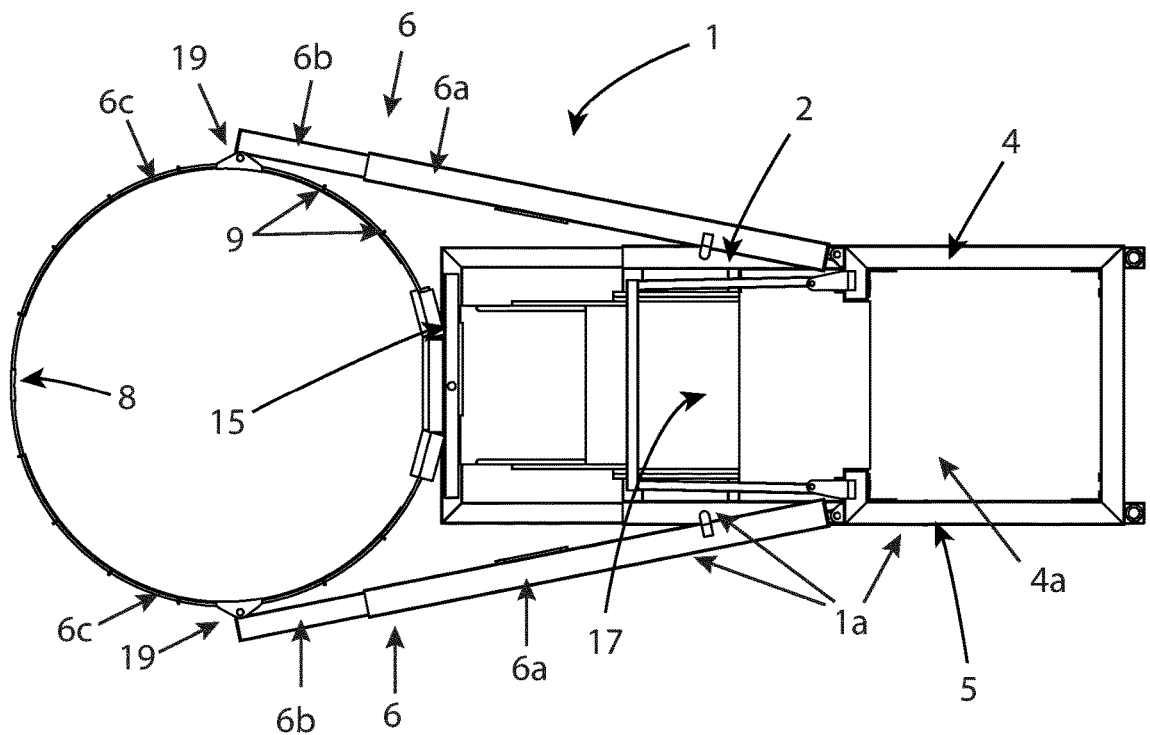
FIG. 8 shows an example securing assembly from above.
Figure 9:
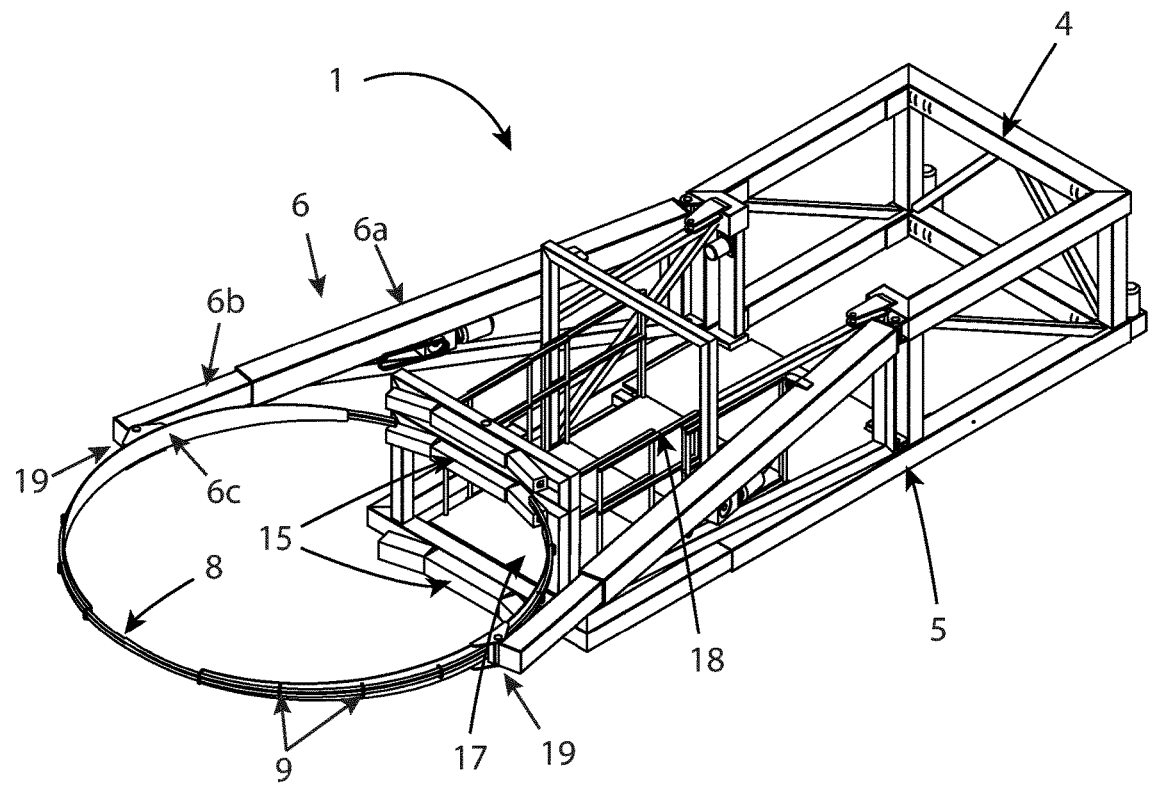
FIG. 9 shows an example securing assembly from a perspective view.
Figure 10:
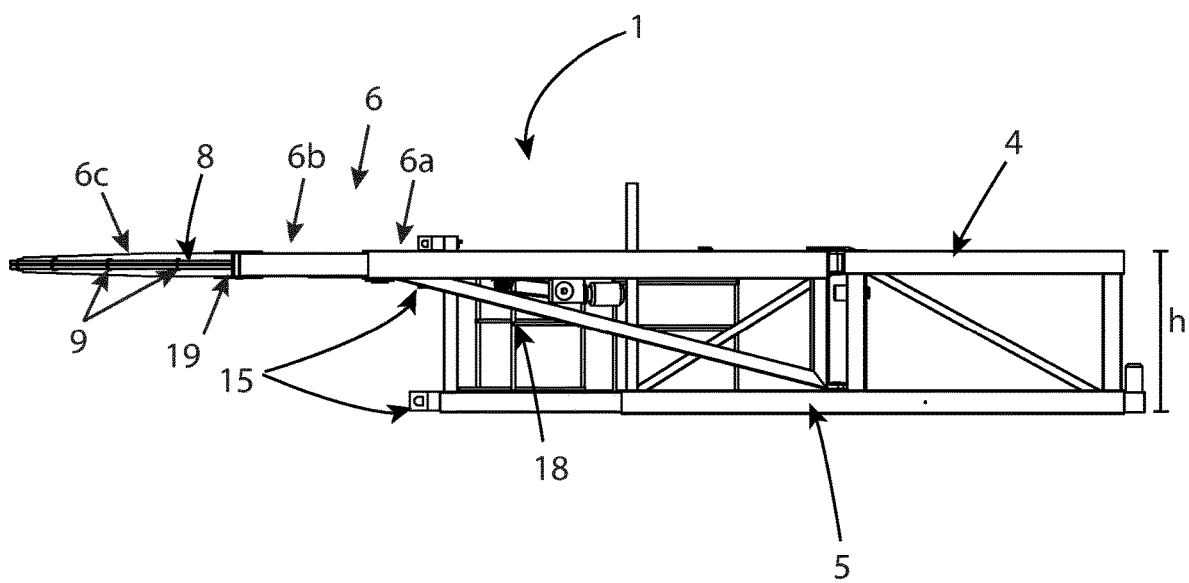
FIG. 10 shows an example securing assembly from the side.

FIGS. 7-11 show an example securing assembly where the securing assembly is higher than previously illustrated. In other words, the securing assembly 1 has a vertical height. FIG. 7 shows an example from a perspective view and FIG. 8 shows the example securing assembly from above. FIG. 9 shows an example securing assembly from different a perspective view and FIG. 10 shows an example securing assembly from the side.

In FIG. 10 the height h of the tower holding part 4 is illustrated. According to some aspects, the tower holding part 4 is adapted to at least partly surround the elongated support tower 2 and the tower holding part 4 has a height of at least 0.5 m. The height is such that the tower holding part 4 at least partly surrounds the elongated support tower 2 along a length of the elongated support tower 2. With a securing assembly which has a height h, the "sticky drawer effect" is avoided, or at least reduced, when moving the securing assembly up and down. A higher securing assembly also distribute forces on the elongated support tower better than a lower securing assembly.

In this example, the securing assembly 1 also comprises a floor 17 for an operator. The floor may be telescopic such that it is retractable when not in use. In the illustrated example of FIGS. 7-11, the floor 17 is attached to the support beam 5 so that it is extracted and retracted with the movement of the support beam. The floor may also be provided with a fence 18 for safety of the operator.

Figure 11:
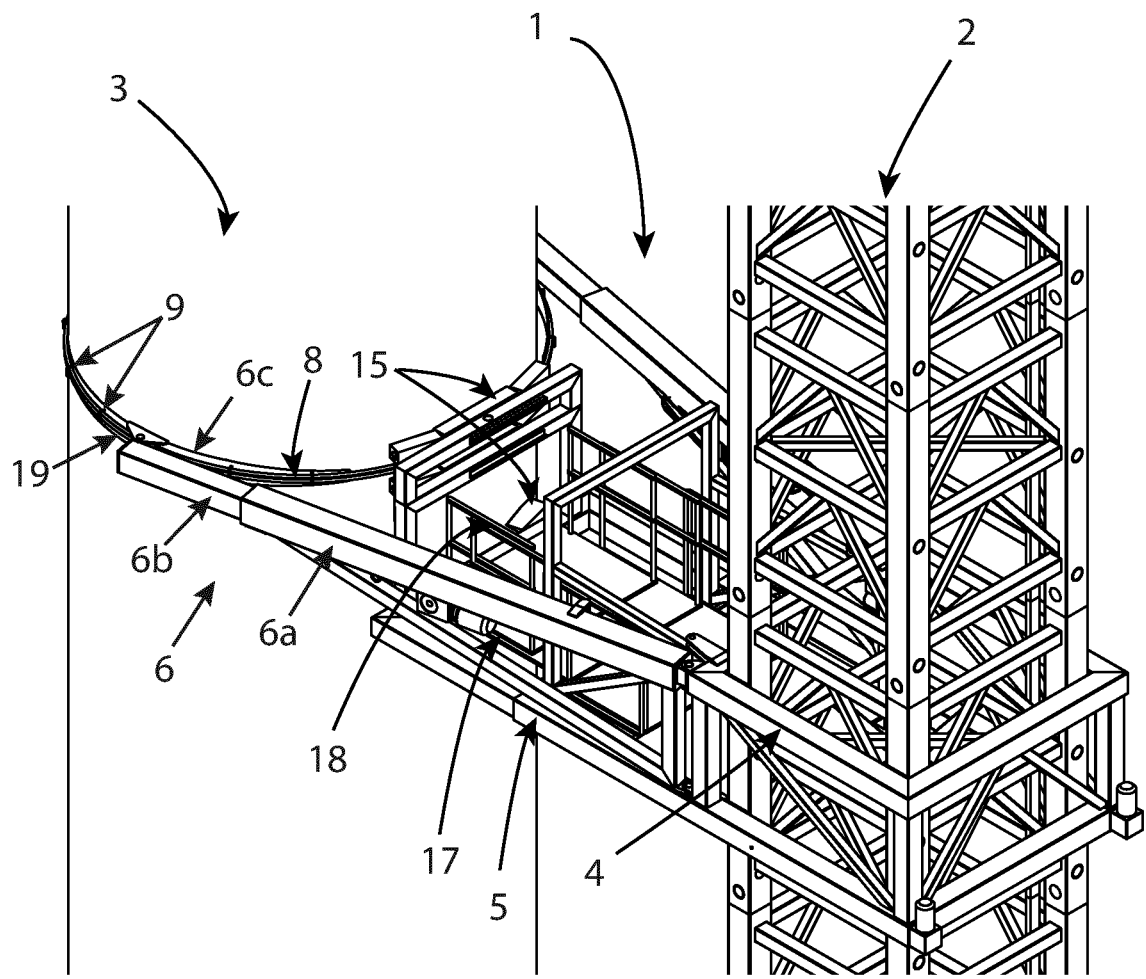
FIG. 11 shows an example securing assembly from a perspective view when it is arranged on a support tower and where the arms are clamping a wind turbine tower.

FIG. 11 shows an example securing assembly from a perspective view when it is arranged on a support tower and where the arms are clamping a wind turbine tower.

In the example shown in FIGS. 7-11, the support beam 15 comprises an upper and lower support beam that both bear against the wind turbine tower. In the case when the support beam 15 is adapted to move linearly such that it presses against the wind turbine tower 3, both support beams are then moved to press against the wind turbine tower.

In the illustrated example, the rope is attached and tightened at the upper support beam but it is also possible that the arms 6 and the are arranged on the lower part of the securing assembly such that the arms 6 and the rope are arranged in the height of the lower support beam 15 or anywhere therebetween.

In the example shown in FIGS. 7-11, the plates 6*c* are attached at the outer part 6*b* with a plate holder 19. The plate holder 19, in this case, allows for the rope 8 to pass between the outer parts 6*b* and the plates 6*c* as well as fastens the plates 6*c* to the outer parts 6*b*. The wind forces on the tower assembly is then transferred to the plates 6*c* through the plate holder 19. The plate holder 19 is for example rotatably attached to the outer part 6*b* and fixedly attached to the plate 6*c*. The plates may also be attached directly to the outer part 6*b*, for example by welding.

It should be noted that when securing an elongated support tower 2 to a wind turbine tower 3, one or more securing assemblies may be used at different heights of the elongated support tower 2.

REFERENCE LIST

1. Securing assembly
a) Base part
2. Elongated support tower
3. Wind turbine tower
4. Tower holding part
a) Opening
b) Pinion
c) Rack
5. Fixed part
6. Arm
a) Inner part, cover portion
b) Outer part, extending portion
c) Plate
7. Moving mechanism
8. Rope
9. Rope sliding element
a) Opening
10. Friction material
11. Tightening device
a) Sliding part
b) Piston
c) rope locking mechanism
12. Movement locking mechanism
13. Mechanical locking mechanism
14. Opening for elevator
15. Support beam 16. Driving mechanism
17. Floor for operator
18. Fence
19. Plate holder

The invention claimed is:

1. A securing assembly (1) for securing an elongated support tower (2) to a wind turbine tower (3), the securing assembly (1) comprising:
   a base part (1*a*) including:
      a tower holding part (4),
      a fixed part (5) fixedly connected to the tower holding part (4),
      two arms (6), each arm comprising an inner part (6*a*) and an outer part (6*b*),
   a rope (8) attached to the base part (1*a*) for at least partly surrounding the wind turbine tower (3),
   a plate (6*c*) arranged at the outer part (6*b*) of each of the two arms (6), the plates (6*c*) being arranged such that they can adapt to the curvature of the wind turbine tower (3) and each comprising at least one rope sliding element (9), arranged to slidably hold the rope (8) and arranged along the plate for guiding the rope (8) around the wind turbine tower (3),
   a rope tightening device (11) arranged on the base part (1*a*), wherein the rope is attached to the base part (1*a*) via the tightening device (11) at at least one end, and the rope (8) being arranged via the rope sliding elements (9) of the plates (6*c*) such that when the rope (8) is tightened using the rope tightening device (11), the rope (8) presses the plates (6*c*) against the wind turbine tower (3).

2. The securing assembly (1) according to claim 1, comprising:
   a support beam (15) connected to the base part (1*a*), for bearing against the wind turbine tower (3).

3. The securing assembly (1) according to claim 2, wherein the support beam (15) is adapted to move linearly such that it presses against the wind turbine tower (3).

4. The securing assembly (1) according to claim 1, wherein at least one of the arms is movable relative to the other and the inner part (6*a*) of the least one moveable arm is rotatably attached to the tower holding part (4) or the fixed part (5).

5. The securing assembly (1) according to claim 4, comprising:
   a moving mechanism (7) adapted to move the at least one moveable arm such that the arms (6) can clamp the wind turbine tower (3).

6. The securing assembly (1) according to claim 5, wherein the two arms (6) are each movable relative to each other, each inner part (6*a*) being rotatably attached to the tower holding part (4) or the fixed part (5) and the moving mechanism (7) being adapted to move each arm.

7. The securing assembly (1) according to claim 1, wherein the rope sliding element (9) has an opening (9*a*) for receiving a rope (8).

8. The securing assembly (1) according to claim 1, wherein the two arms (6) are telescopic arms (6), the inner part (6*a*) being a cover portion (6*a*) and the outer part (6*b*) being an extending portion (6*b*), and the extending portion (6*b*) is adapted to at least partly be withdrawn into the cover portion (6*a*) to reduce the length of the arms (6).

9. The securing assembly (1) according to claim 1, wherein the plates (6*c*) comprise a friction material (10) with a friction coefficient larger than 0.30 on a side facing the plate (6*c*) on another one of the arms.

10. The securing assembly (1) according to claim 1, wherein the tightening device (11) comprises a sliding part (11*a*) where an end of the rope (8) is fastened, the sliding part (11*a*) being slidable to adjust the tension in the rope (8).

11. The securing assembly (1) according to claim 4, comprising a movement locking mechanism (12) for each arm that is movable relative to the other, wherein the arms (6) are prevented from moving when the movement locking mechanisms (12) are actuated.

12. The securing assembly (1) according to claim 8, comprising two mechanical locking mechanisms (13), wherein the extending portions (6*b*) are prevented from moving relative the cover portions (6*a*) when the two mechanical locking mechanisms (13) are actuated.

13. The securing assembly (1) according to claim 1, comprising a rope locking mechanism (11*c*) for the tightening device (11), which locks the tightening device (11) from moving when actuated.

14. The securing assembly (1) according to claim 1, wherein the tower holding part (4) is adapted to at least partly surround the elongated support tower (2) and the tower holding part (4) having a height of at least 0.5 m.

* * * * *